US010235419B2

(12) United States Patent
Pronk et al.

(10) Patent No.: US 10,235,419 B2
(45) Date of Patent: Mar. 19, 2019

(54) AUTOMATIC GENERATION OF RATING REQUESTS FROM A RECOMMENDER SYSTEM

(71) Applicant: S.I. SV.EL. SOCIETA ITALIANA PER LO SVILUPPO DELL'ELETTRONICA S.P.A., None (TO) (IT)

(72) Inventors: Serverius Petrus Paulus Pronk, Eindhoven (NL); Mauro Barbieri, Eindhoven (NL); Johannes Henricus Maria Korst, Eindhoven (NL)

(73) Assignee: S.I.SV.EL. SOCIETA ITALIANA PER LO SVILUPPO DELL'ELETTRONICA S.P.A., None (TO) (IT)

( * ) Notice: Subject to any disclaimer, the term of this patent is extended or adjusted under 35 U.S.C. 154(b) by 510 days.

(21) Appl. No.: 14/351,195

(22) PCT Filed: Oct. 12, 2012

(86) PCT No.: PCT/IB2012/055543
§ 371 (c)(1),
(2) Date: Apr. 11, 2014

(87) PCT Pub. No.: WO2013/054299
PCT Pub. Date: Apr. 18, 2013

(65) Prior Publication Data
US 2014/0236989 A1 Aug. 21, 2014
Related U.S. Application Data

(60) Provisional application No. 61/546,588, filed on Oct. 13, 2011.

(51) Int. Cl.
G06F 17/30 (2006.01)
H04N 21/25 (2011.01)
(Continued)

(52) U.S. Cl.
CPC ... *G06F 17/30522* (2013.01); *G06Q 30/0282* (2013.01); *H04N 21/252* (2013.01);
(Continued)

(58) Field of Classification Search
CPC .......... G06F 17/30522; G06Q 30/0282; H04N 21/252; H04N 21/4756; H04N 21/4668; H04N 21/4788
See application file for complete search history.

(56) References Cited

U.S. PATENT DOCUMENTS

| 7,703,030 B2 | 4/2010 | Smirin |
| 2002/0136538 A1* | 9/2002 | Chen ............... H04N 9/7921 386/328 |

(Continued)

FOREIGN PATENT DOCUMENTS

| CN | 102088626 A | 6/2011 |
| WO | WO03071791 A1 | 8/2003 |

OTHER PUBLICATIONS

Terveen, Beyond Recommender Systems: Helping People Help Each Other, 2001, pp. 1-21.*

(Continued)

*Primary Examiner* — Albert M Phillips, III
(74) *Attorney, Agent, or Firm* — Workman Nydegger

(57) ABSTRACT

The recommender system uses stored representations of relations between users. Access to an item by one or more first users in the storage system is recorded. When the recommender system detects a request for a rating of the item from a second user, the recommender system selects at least one of the first users that occurs in a stored relation with the second user. A query message that refers to the second user is then automatically transmitted to enter a rating for the item to a user address associated with the selected first users. Preferably at least one first user is selected for which it has been recorded that it has accessed the item but for which it has not yet given a rating. Preferably, the rating from the first user is passed to the second user via the recommender system, which records the rating for further use. The selection of the first user may be based on recorded data that measures correlation between ratings from the first and second user.

15 Claims, 4 Drawing Sheets

(51) Int. Cl.
*H04N 21/466* (2011.01)
*H04N 21/475* (2011.01)
*H04N 21/4788* (2011.01)
*G06Q 30/02* (2012.01)

(52) U.S. Cl.
CPC ..... *H04N 21/4668* (2013.01); *H04N 21/4756* (2013.01); *H04N 21/4788* (2013.01)

(56) References Cited

U.S. PATENT DOCUMENTS

| | | | | |
|---|---|---|---|---|
| 2003/0191753 | A1* | 10/2003 | Hoch | G06F 17/30867 |
| 2006/0265599 | A1* | 11/2006 | Kanai | H04L 63/10 |
| | | | | 713/182 |
| 2008/0133678 | A1 | 6/2008 | Woodham | |
| 2008/0255870 | A1 | 10/2008 | Butler | |
| 2009/0070228 | A1* | 3/2009 | Ronen | G06Q 30/0603 |
| | | | | 705/26.1 |
| 2010/0031148 | A1 | 2/2010 | Rivera | |
| 2010/0325584 | A1* | 12/2010 | McKenzie | G06Q 50/18 |
| | | | | 715/835 |
| 2011/0184780 | A1* | 7/2011 | Alderson | G06Q 30/02 |
| | | | | 705/7.32 |
| 2011/0202617 | A1* | 8/2011 | Naidu | G06Q 10/10 |
| | | | | 709/206 |

OTHER PUBLICATIONS

Xiwang Yang et al., "Bayesian-Inference based Recommendation in Online Social Networks", INFOCOM, 2011 Proceedings IEEE, IEEE, Apr. 10, 2011 (Apr. 10, 2011), pp. 551-555, XP031953609.

Jong Seo Lee, "Recommender System for Audio Recordings", Faculty of California Polytechnic State University, Jan. 2010, 85 pages.

* cited by examiner

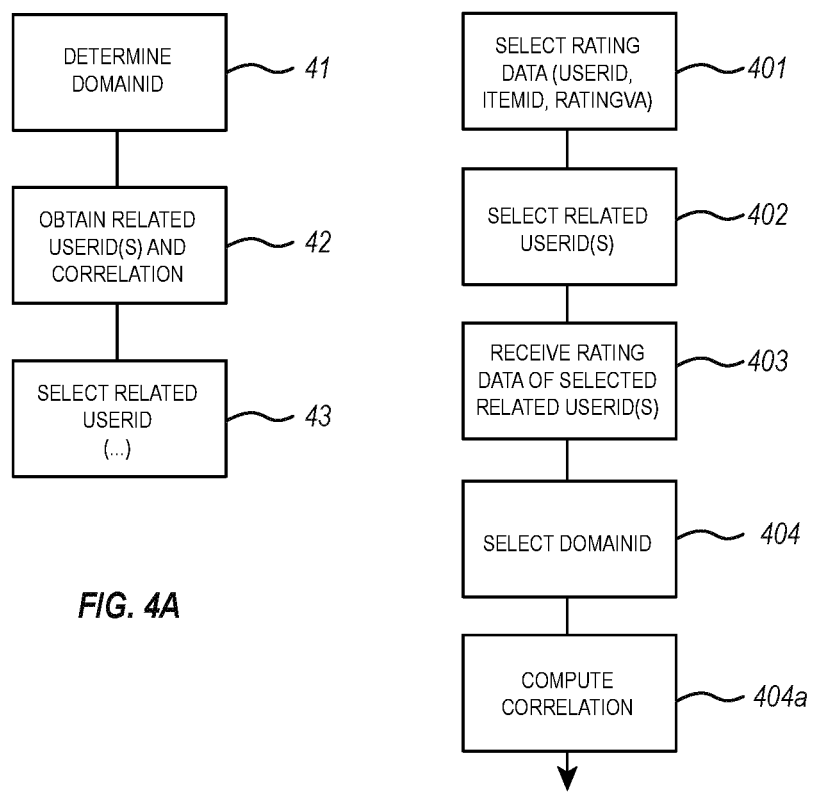

AUTOMATIC GENERATION OF RATING REQUESTS FROM A RECOMMENDER SYSTEM

FIELD OF THE INVENTION

The invention relates to a recommender system.

BACKGROUND

Recommender systems are known for example from electronic program guides, where they are used to reduce input about a large number of available programs to a selection of a more limited number of possible viewing choices and to present these choices to a user. User-rating-based recommender systems gather rating data for individual choices from users and use this rating data to direct the selection of possible choices. A predicted rating of an item by a user may be computed by weighting ratings form different users for the item according to similarity between the users. In collaborative filtering, collected ratings from different users for the same items are used to search for correlations between users. More generally, a user-rating-based recommender system is designed to make user-dependent selections from sets of items or ordered lists of items, based on rating input collected from different users.

A recommender system that makes use of social network information is described in (Yang, X., Y. Guo, and Y. Liu [2011]. Bayesian-inference Based Recommendation in Online Social Networks, in *Proceedings of the International Conference on Computer Communications*, IEEE INFOCOM 2011, Shanghai, China, Apr. 10-15, 2011, pp. 551-555 . The authors propose to compute predicted ratings with weights selected dependent on the closeness of users in a social network. The article describes that a user can also query his friends to obtain ratings of a specific movie, or that ratings from friends of friends in the social network can be used, but with less weight.

In each case the quality of user-rating-based recommender systems depends on the availability of ratings provided by users. If no rating from any user is available for an item, no rating-based-recommendation of the item is possible. With available ratings from increasing numbers of users, increasingly more reliable computations of recommendations become possible

SUMMARY

Among others, it is an object to provide for a recommender system that provides for measures to increase the number of ratings given by users.

A method according to claim 1 is provided. Herein query messages are sent automatically to a selection of one or more first users to provide a rating for an item for the benefit of a second user when a request for a rating is detected from the second user. In an embodiment, the query messages may be transmitted over a network from a recommender system to a user address such as an address of a terminal or an e-mail address of the second user for example. In an embodiment, information derived from a reply to the query message is provided to both the second user and the recommender system, the latter for storage of the rating, for example by automatic forwarding of reply information received by the recommender system to an address of the second user, or automatic forwarding of reply information received by the user terminal of the second user to the recommender system, or by transmission of the reply to both the recommender system and the user address of the second user, based on the query.

In an embodiment, the recommender system may be coupled to a video on demand delivery system, wherein the items are video items that represent streams of video images. The request for a rating may be an explicit request, or an implicit request, such as access, on behalf of the second user, to any information about the item. The system may be configured to generate recommendations that comprise information that enables the user terminal of the second user to access the item, for example address data to cause a selected video stream to be transmitted from a video on demand system.

The one or more first users are selected based on recorded relations between the first and second users. In an embodiment the first users may be limited to users for which it has been recorded that first users have accessed the item but for which at least one of the first users no rating of the item has been recorded. This provides for a limitation of the number of transmitted query messages to first users that are expected to be more likely to reply, while avoiding duplication of rating input. The relations may be recorded in the form of social network data, which defines user identifiers of first persons that are friends of a second person identified by a second user identifier, or pairs of user identifiers that indicate related persons. A rating is a score for an item. A recommendation may represent a predicted score, computed from other ratings in ways that are known per se.

In an embodiment a reply to a query is used both to transmit a rating or recommendation, based on the reply to a user station associated with the second user and to expand the collection of stored ratings. In this way, ratings provided for the second user automatically also become available in the stored collection of ratings of the recommender system. The reply may be received by the recommender station and forwarded to the second user, or return addresses of both the second user and the recommender system may be included in the query message, so that copies of the reply will be sent to both. However, it is not necessary that the second user receives the ratings of the one or more first users. If the rating of the one or more first users is low, a candidate item may simply not be recommended to the second user and the second user may never know that the item was a candidate for recommendation.

In a further embodiment the transmitted query may comprise information that identifies an address of the second user based on the query, the rating or recommendation being transmitted to the user station associated with the second user based on the obtained address. In this way the ratings can be sent to the second user, for example from a user station of the first user that replies to the query so that message traffic at the recommender system is reduced.

In an embodiment, for a first user a count of second users is determined that occur in a stored relation with the first user and which second users have requested a rating or recommendation for an item. This count may be determined for example selectively for first users that have accessed the item. In this embodiment the automatic transmission of queries for a rating to a first user for the item is delayed if said count for the item is below a predetermined threshold that is greater than one. In this way, it is made possible to reduce message traffic by collecting more second users before the queries are sent. In a further embodiment the query may be transmitted once a time interval of more than a predetermined duration has occurred after the request from the second user, even if the count is below the threshold.

In an embodiment the method comprises limiting transmission of the queries to first users that have a high correlation score with the second user. Correlation score values may be computed for pairs of users, each pair comprising the second user and a respective one of the first users, each score value being computed from a correlation between ratings given for further items given by the respective one of the first users and a rating and/or access to the further items by the second user. In this way the number of query transmissions can be further reduced to queries that are more likely to result in a useful reply. In a further embodiment the score values are computed for a specific domain of further items that also contains the item for which the recommendation is requested. This makes query transmissions more efficient.

A computer program product, such as a semi-conductor memory, a magnetically or optically readable disk or an Internet signal is provided that comprises a program of instructions for a programmable computer system that, when executed by the programmable computer system will cause the programmable computer system to execute the method.

Furthermore a recommender system is provided that transmits query messages to selected users.

BRIEF DESCRIPTION OF THE DRAWINGS

These and other objects and advantageous aspects will become apparent from a description of exemplary embodiments, with reference to the following figures.

FIGS. 4a, b illustrate an embodiment wherein additional information for the selection of users is collected

DETAILED DESCRIPTION OF EXEMPLARY EMBODIMENTS

Figure 1:
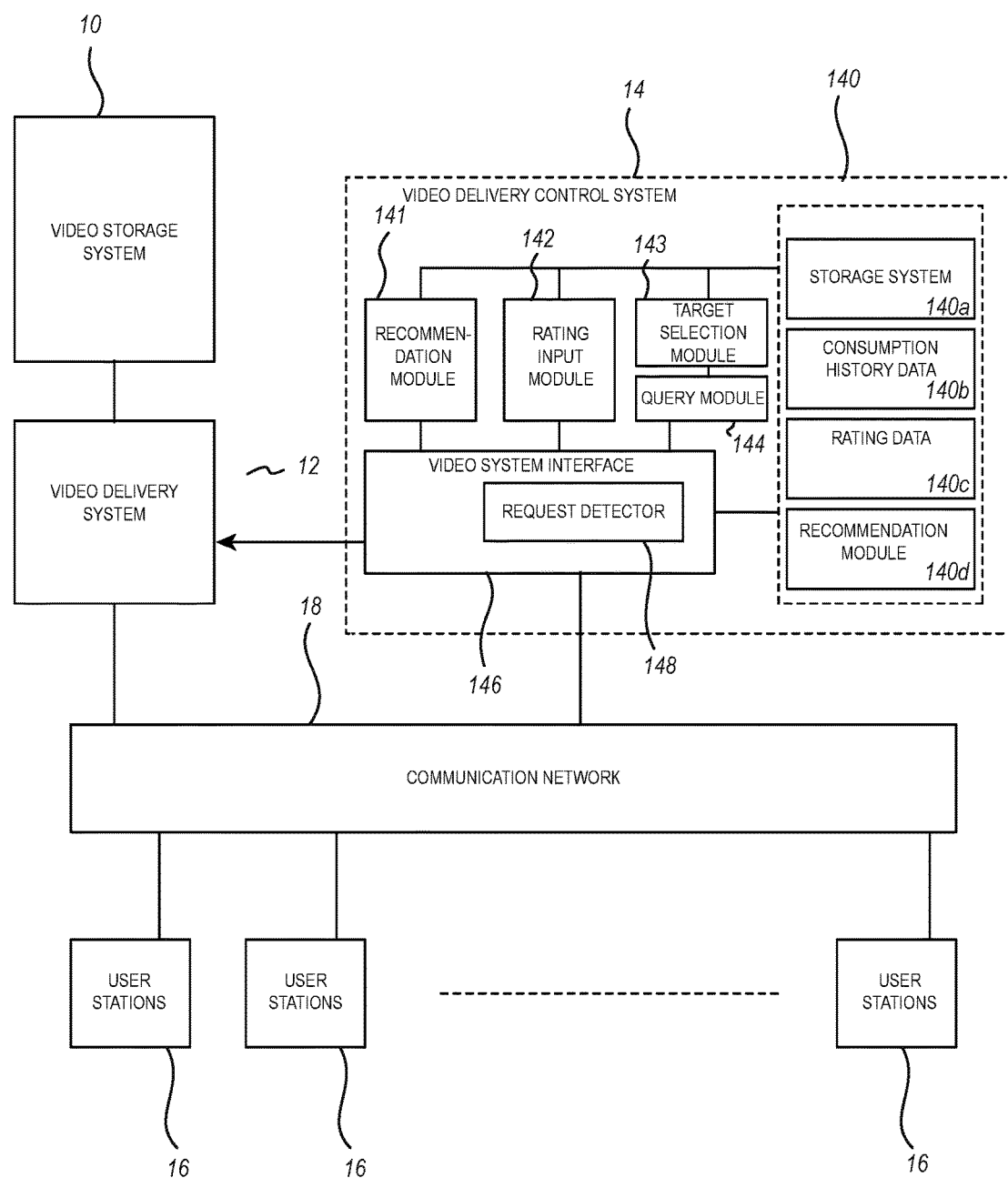
FIG. 1 shows an example of a recommender system

FIG. 1 shows a video on demand system, comprising a video storage system 10, a video delivery system 12, a video delivery control system 14, a plurality of user stations 16 and a communication network 18. Video delivery system 12 couples video storage system 10 to user stations 16 via communication network 18. Video delivery control system 14 is coupled to video delivery system 12 and to user stations 16.

By way of example, video delivery control system 14 is shown to be coupled directly to video delivery system 12 and to user stations 16 via the same communication network 18 that is used to couple video delivery system 12 to user stations 16, but it should be appreciated that video delivery control system 14 may be coupled to user stations 16 via another communication network, and/or video delivery control system 14 may be coupled to video delivery system 12 via a network, such as communication network 18.

Video delivery control system 14 comprises a storage system 140, a recommendation module 141, a rating input module 142, a target selection module 143, a query module 144 and a video system interface 146. Video system interface 146 comprises a detector 148 for detecting requests for recommendations. Recommendation module 141, rating input module 142, target selection module 143, query module 144 and video system interface 146 are coupled to storage system 140. Video system interface 146 is coupled to user stations 16 via communication network 18 and to video delivery system 12. Storage system 140 has storage areas 140a-d for social network data, consumption history data, rating data and recommendation requests, respectively. Video delivery control system 14 may be implemented using a programmable computer for example, with program modules containing instructions to make the computer to perform the user interface function of user interface 146, the recommendation function of recommendation module 141 and the query function of query module 144 respectively.

A social network may be represented by a graph wherein users correspond to nodes and links between nodes indicate that the corresponding users defined by the nodes are friends. The links may be uni-directional, to indicate that one user is considered to be the friend of the other but not vice versa. The social network data in the storage area 140a for social network data of storage system 140 may comprise records with fields (UserID1, UserID2) for user identifiers that are related by such a link. However, any form of representation may be used. For example, for each user a list of one or more userids of related users may be provided or a matrix with matrix elements for pairs of user, the content of the element indicating whether or not the pair is related etc.

In operation, recommendation module 141 generates a recommendation for one or more video items from video storage system 10 and passes the recommendation to video system interface 146. A recommendation may be data representing a selected identifier (ItemID) that can be used to control video delivery system 12 to deliver a video item in combination with a rating value, or an ordered list of such identifiers, the recommendation containing each identifier in combination with data representing a title of the video item, an image associated with the video item and/or other descriptive information or reference pointers to such information. Video system interface 146 transmits the recommendations to user station 16 and receives back orders for selected video items from user station 16, the orders including the identifiers of the video items. Upon reception of an order for a selected video item, video system interface 146 sends a command containing the identifier to video delivery system 12 to read video data representing the selected video item and to stream this data to user station 16, which renders the video item.

Furthermore, video system interface 146 receives messages with rating input values provided by users from user stations 16 and passes these to rating input module 142. Rating input module 142 records the rating values in combination with an identification of the user that provided the rating in the store area for rating data 140c. In an embodiment the storage area for rating data 140c may contain a table of records with fields (UserID, ItemID, Rating Value) for a user identifier, the identifier of the video item and the received rating value. In a further embodiment video system interface 146 may record further information, such as a time and/or date T of entering the rating value. Records with fields (UserID, ItemID, RatingValue, T) may be used for example. In another embodiment, this type of information may be combined with a table with consumption history data, using a flag, such as a default value for the rating, as long as no rating value has been received.

Furthermore, video system interface 146 records the orders in the storage area for consumption history data 140b of storage system 140. In an embodiment the storage area for consumption history data 140b may contain a table of records with fields (UserID, ItemID) for a user identifier and the identifier of the ordered video item. Video system interface 146 may derive the user identifier for example from an address of user station 16 or, if user station 16 is configured to identify users, from a user identifier supplied by user station 16. User station 16 may be configured to identify a user for example by requiring the user to log in to a user account associated with a user identifier, by reading a tag such as an RFID tag or smart card supplied by the user, from biometric identification such as face recognition or fingerprint recognition etc. In a further embodiment video system interface 146 may record further information, such as a time and/or date T of the order, a duration D before delivery of the video item was stopped by the user, etc. Records with fields (UserID, ItemID, T, D) may be used for example.

Video system interface 146 contains a detector 148 for detecting requests for ratings of specific video items. Detector 148 may be configured to detect received messages from user stations 16 that are explicitly identified as such requests, but detector 148 may also be configured to detect implicit requests, such as requests that are detected to result in transmission of information about the video item. Furthermore, user stations 16 may provide for entering explicit requests for recommendations, or for detection of implicit requests, and for transmission of recommendation request messages to video system interface 146 upon such a detection. Video system interface 146 records detected requests in the storage area for requests 140d of storage system 140. In an embodiment the storage area for requests 140d may contain a table of records with fields (UserID, ItemID) for a user identifier and an identifier the video item for which a recommendation is requested. In a further embodiment video system interface 146 may record further information, such as a time and/or date T of entering the request. A record containing fields (UserID, ItemID, T) may be used for example.

Figure 2:
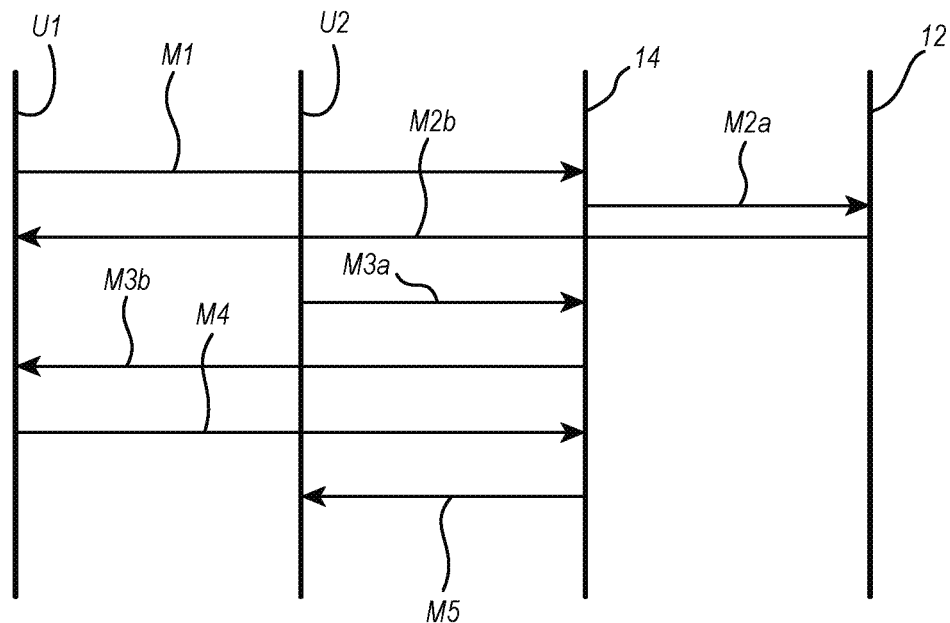
FIG. 2, 2a shows message traffic

FIG. 2 illustrates message traffic involved in the use of queries for rating values. This involves an order message M1 for a video item indicated by an identifier ItemID from one or more first user stations U1 (only one shown) of a first user to video delivery control system 14. The order message M1 is part of normal video ordering and delivery message traffic. Control system 14 may respond to the order message M1 by sending a command M2a to video delivery system 12 to deliver the ordered video item and the video delivery system may respond to the command by transmitting a message or a stream of messages M2b that represent the ordered video item to the ordering user station U1.

Figure 2A:
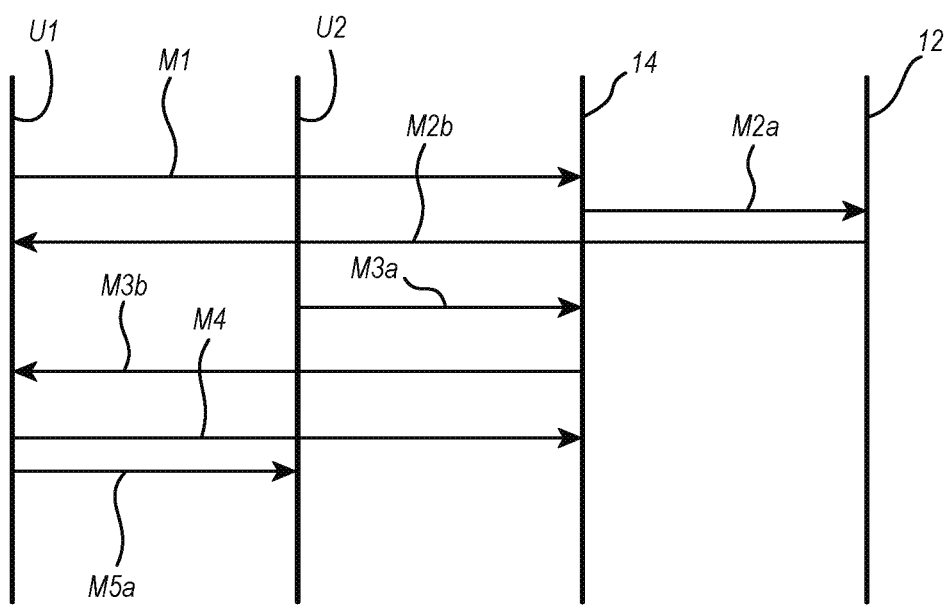

In addition to order traffic, the traffic involved with queries comprises one or more explicit or implicit request messages M3a for a rating of the video item from one or more second user stations U2 (only one shown) of second users to video delivery control system 14. Furthermore, it involves transmitting a query message M3b for prompting a user to enter a rating value for the video item from video delivery control system 14 to the user station U1 of at least one of the first users. A query message may result in a rating message M4 from the user station U1 to video delivery control system 14 in response to the query message M3b and in a recommendation message M5 from video delivery control system 14 to the user station U2 of a second user or of a plurality of second users. For example, a recommender system may select a plurality of candidate items for recommendation to a second user (e.g. based on an initial score), send one or more of the candidate items to one or more first users in query messages M3b, determine the final list of recommendations based on the ratings received in rating messages M4 and send the final list of recommendations to the second user in recommendation message M5. FIG. 2a shows an alternative, wherein a recommendation message M5a is sent directly from the user station U1 of the first user to the user station U2 of the second user or users. Query module 144 records order messages M1 and request messages M3a in storage system 140. For example, a query message M3b may be sent to one or more first users with respect to a certain item in response to the second user requesting information about that certain item. The rating in recommendation message M5a may be displayed together with other information about that certain item (e.g. a description and actor information) on user station U2.

During operation, target selection module 143 and query module 144 operate to generate queries, each query being directed at input of a rating value for a specific video item from a specific user. Query module 144 supplies the generated query to video system interface 146, which controls a user station 16 associated with the specific user to prompt the user to input the rating value. When the user complies by providing a rating value, user station 16 sends back the rating value to video system interface 146, which forwards it to rating input module 142 that stores the rating value in the storage area for rating data 140c of storage system 140.

Figure 3:
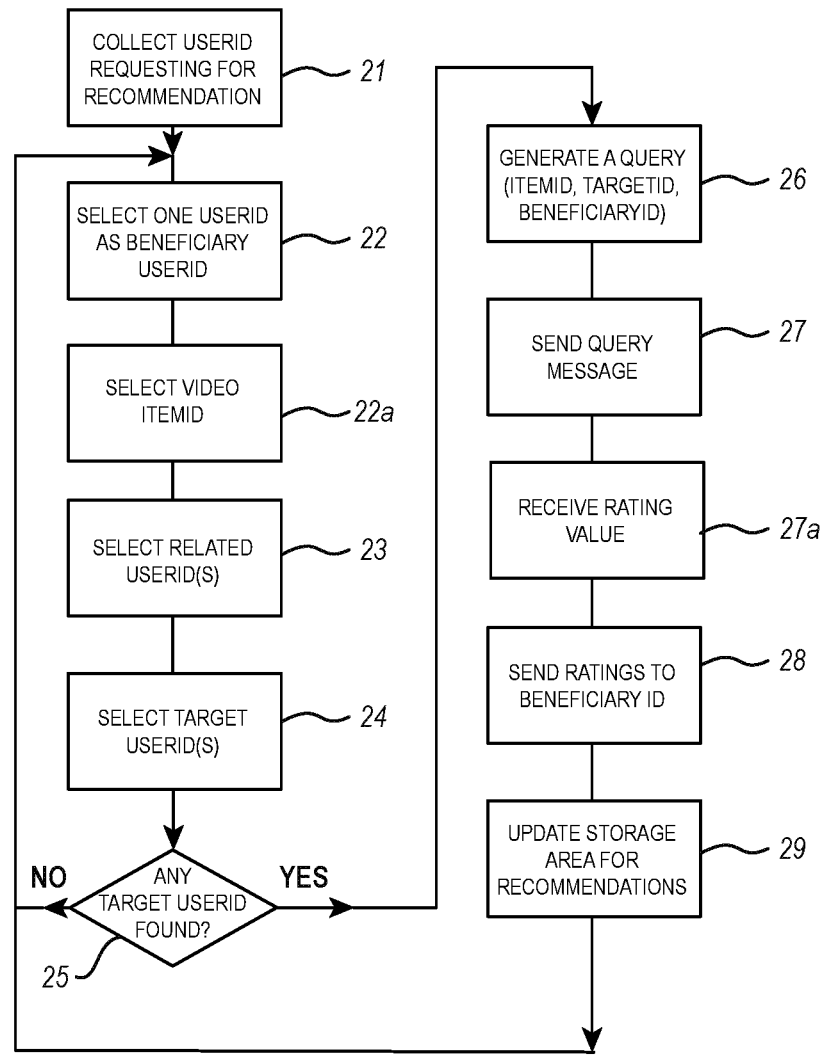
FIG. 3 shows a flow-chart of a basic process for query generation

FIG. 3 shows a flow-chart of a basic process for query generation. In a first step 21 target selection module 143 collects users (UserIDs) for which the storage area for recommendation requests 140d contains a record of a request message M3a for a rating or recommendation. In a second step 22 target selection module 143 selects one of these UserID as a BeneficiaryUserID and target selection module 143 selects a video item (ItemID) for which a request for recommendation from the selected BeneficiaryUserID has been recorded.

In a third step 23 target selection module 143 uses social network data from the storage area 140a for social network data to select a set of related users ((RelatedUserIDs) that are related to the BeneficiaryUserID by the social network data. In a fourth step 24, target selection module 143 selects users (TargetUserIDs) from the related users (RelatedUserIDs) that have viewed the selected video item or have ordered the selected video item, and have not provided a rating value. Target selection module 143 may do so for example by retaining only those RelatedUserIDs from the set of related users for which the storage area for consumption history data contains a record for the RelatedUserID that relates to the ItemID for the selected video item (e.g. only if the recorded viewing duration D exceeds a predetermined threshold, or already if the video item has been ordered) and selecting those records that have a UserID=RelatedUserID for which no rating value for the ItemID has been entered. Optionally, the selection of records is further limited by excluding records in which the time point of viewing is more than a predetermined time interval before the current time. In a fifth step 25, target selection module 143 may test whether one or more such related users (BeneficiaryUserIDs) are found for the target user (TargetID). If not, target selection module 143 repeats from second step 22 to select another video item and/or BeneficiaryUserID.

If one or more of such related users (TargetUserIDs) are found for the BeneficiaryUserID, target selection module 143 passes information identifying the selected target users to query module 144 and query module 144 executes a sixth step 26, wherein it generates a query for a rating value for the video item ItemID from the target user (TargetID). The query may comprise data (ItemID, TargetID, BeneficiaryUserID) representing the video item for which the rating value is queried, the user from which the rating value is queried and a user that requested a rating.

In a seventh step 27 video system interface 146 uses the generated queries (messages M3) to send query messages to the user stations 16 associated with the target users. This step need not be executed immediately: for example, it may be executed when a target user logs on to the user station, or when the user requests information from the video delivery control system. Video system interface 146 may select user stations 16 based on the user ID of the target users (for example by selecting a user station 16 on which the user with this user ID is logged in), and to cause the selected user stations 16 to prompt the user to enter a rating value for the video item ItemID Preferably, video system interface 146 causes the query messages to be accompanied by an identification of the related user (or users (BeneficiaryUserIDs) for which the rating value was requested, or an identifier that allows this information to be retrieved. When the user enters a rating value, the user station 16 responds by returning a message M4 with the rating value to video system interface 146, including the identification of the related user or users (BeneficiaryUserIDs), or an identifier that allows video system interface 146 to retrieve this information. Rating input module 142 may record the rating values as described in the preceding. A rating valve is received at 27a.

In an eight step 28 video system interface 146 sends the received rating value to the user station 16 of the selected user (BeneficiaryUserID), based on the information about that selected user from the query. Preferably, video system interface 146 sends the received rating value accompanied by an identification of the target user that provided the rating value. In an alternative embodiment, video system interface 146 transmits an indication of an address of the requesting user (BeneficiaryUserID) to the user station 16 of the target user and the user station 16 of the target user may use this indication to send the rating value to the user station 16 of the indicated user directly (as shown in FIG. 2a by alternative message M5a). In a ninth step 29, when the recommendation has been sent, video system interface 146 may update the storage area for recommendation requests 140d, to remove the corresponding request, or to mark it as fulfilled, so that it will not be used again. After step 29 the process may be repeated from second step 22 for other users that requested recommendations and/or for other video items. If all users that requested recommendations and all video items have been processed, the process may be repeated ab initio after a time delay. Thus the process may be repeated periodically, in order to account for new requests for recommendations and/or new viewing and/or orders for video items.

In an embodiment an additional step may be added after sixth step 26, wherein target selection module 143 uses each of the TargetIDs to perform a search for further BeneficiaryUserIDs of users for which the social network data records that they are related to TargetID and for which the recorded recommendation requests 140d include a request message M3a for a recommendation of the video item ItemID Target selection module 143 adds these further BeneficiaryUserIDs to the request. In this embodiment the related users found in the search are also communicated to the TargetUserID and a received rating is sent to all BeneficiaryUserIDs of the request, by video system interface 146 (a plurality of messages M5) or by the user station 16 of the target user directly (a plurality of messages M5a). Both relieve a possible communication bottleneck at video system interface 146.

In a further embodiment, target selection module 143 may be configured to cause a query to be generated only if the condition is met that at least a predetermined number of related requesting user IDs (BeneficiaryUserIDs) for the same video item ItemID is found, or the recorded time of any one of the requests is more than a predetermined duration before a current time. In this way, when the process of FIG. 3 is executed periodically, the generation of queries is delayed until a number of BeneficiaryUserIDs can be combined, if this is possible without excessive delay. This also reduces possible communication bottlenecks. Furthermore, it may provide more incentive to supply a rating.

Although an embodiment has been described that starts with the selection of users that have requested a recommendation, and uses this starting point to search for target users, it should be appreciated that any order of searching may be used. Given an ItemID, a database query may be generated for TargetIDs for all target users that are (i) related to users (BeneficiaryUserIDs) for which requests for a rating of that item have been recorded, when (ii) the target users have viewed or at least ordered the item with the ItemID but (iii) the target users have not yet given a rating for that item. However, it should be appreciated that it may be desirable to prompt only part of the target users that satisfy these conditions or to prompt them only by reference to a limited number of related users (BeneficiaryUserIDs). This can be used to avoid that ratings from many users (TargetIDs) have to be sent to a same related user (BeneficiaryUserID).

FIGS. 4a and 4b illustrate an embodiment wherein video system interface 146 collects additional information for the selection of users (TargetUserIDs) from which rating values will be requested, and target selection module 143 selects the target users dependent on this additional information. The additional information records a score value for correlation between ratings provided for classes of video items by specific users that may serve as target users and ratings and/or subsequent viewing or ordering of the video items by users who received recommendation for these items. The additional information may be part of a user profile of a user for example, or part of a stored relation between users. Such a relation may be stored in the social network data. The additional information may take the form of records (UserID1, UserID2, DomainID, CorrelationScore), or other information that represents such records, stored in storage system 140. Herein the CorrelationScore is a score value that represents correlation between ratings provided for video items by the user identified by UserID1 and ratings and/or viewing or orders of video items by the user identified with UserID2, as far as the ratings and viewing orders apply to video items that belong to a domain defined by the DomainID The DomainID could identify a class of video items (e.g. action movies, or sports video, or documentary etc). For each video item one or more of such DomainIDs may be recorded, or the DomainIDs may be defined as functions of recorded attributes of the video items.

The steps of FIG. 4a may be part of the process of FIG. 3, for example of third step 23, wherein target selection module 143 selects a set of related users (RelatedUserIDs) for a requesting user (BeneficiaryUserID) and a video item (ItemID) In a first step 41, target selection module 143 determines one or more domains (DomainID) to which the video item (ItemID) belongs. In a second step 42, target selection module 143 determines related users (RelatedUserIDs) that are related to the user (BeneficiaryUserID) and it obtains correlation score values from the additional information for the combination of the user and the related user (RelatedUserID, BeneficiaryUserID) in the selected domain (DomainID) In a third step 43, target selection module 143 selects only those related users (RelatedUserID) for which the correlation score value is above a threshold value. In this way selection of related users is limited to users that are known to provide ratings that are relevant to the requesting user. The limitation to such users may also be implemented as part of the step of selecting target users (TargetID): fourth step 24 of FIG. 3. Limitations of the number of target users reduces the required message traffic and the absence of uncorrelated users likely reduces the fraction of rating requests that does not pay off does not result in a response.

FIG. 4b illustrates a computation of the additional information. It should be emphasized that the flow chart of FIG. 4b is merely one example of such a computation. In a first step 401, video system interface 146 (or a correlation module not explicitly shown in FIG. 1) of video delivery control system 14 selects stored rating data, which may indicate a user (UserID2), a video item (ItemID), and a rating value (RatingValue2). In a second step 402, video system interface 146 or the correlation module uses the social network data to select a set of users (represented by UserID1 values) that are related to the user that provided the rating.

In a third step 403, video system interface 146 or the correlation module retrieves the rating data to identify ratings (RateValue1) provided for the item (ItemID) by the related users (UserID1). In a fourth step 404 and 404a, video system interface 146 or the correlation module determines for each of a series of domains (DomainID) whether the item (ItemID) belongs to the domain (DomainID) If so, video system interface 146 or the correlation module updates information to compute a correlation score value for the combination of the users (UserID1, UserID2) for the domain (DomainID)

The correlation score may be defined in any convenient way, for example as a weighted sum of product Ratingvalue1*Ratingvalue2 summed over different video items, or a weighted sum of products (Ratingvalue1−−Average1)*(Ratingvalue2−Average2), or using a matrix with fields for combinations of rating values (Ratingvalue1, Ratingvalue2), each field containing a count of a number of video items for which the combination has occurred. In third step 403, video system interface 146 or the correlation module updates the information for each combination of users (UserID1, UserID2) accordingly. This is done for at least one domain to which the video item belongs.

As noted, the flow chart of FIG. 4b is merely one example of such a computation. In another example, the weight of the contribution of rating values (Ratingvalue1, Ratingvalue2) may depend on elapsed time since the rating values were given and/or the time between recorded time points at which the rating values were given. Instead of using all rating values, first step 401 may select only newly given rating values.

Consumption history data may be used instead of rating data in first step 401. In this case, the correlation score values may be computed in terms of averages of rating values (RatingValue1) from the related user (UserID1) for video items that have been viewed for at least a predetermined duration and items that have been viewed less than that duration or not at all, or ordered and not ordered for example, or as a table with fields for different rating values, each field comprising a count or relative frequency of viewing or ordering of video items that received the rating value of the field.

Although an application to a video on demand system has been described, it should be appreciated that a similar method of requesting for ratings can be applied to systems that recommend items other than video items. Video delivery control system 14 is just one example of a system that operates as an access monitor that is configured to process and record the access events such as viewing or ordering of video items and to store records in the storage system, comprising records that indicate users that accessed the item. Similarly, rating input module 142 is merely one example of a rating input interface, configured to receive ratings for items from users. Similarly, detector 148 of video system interface 146 is merely one example of a detector configured to detect requests sent by users for recommendations of items, a selection module to select target users and a query module configured to transmit a prompt to the selected at least one of the first users to enter a rating. When video system interface 146 computes correlation score values it acts as relation scoring module. However, it should be appreciated that one or more of these functions could be implemented combined in a single module. As used herein, when a module or other element is said to perform an operation or to be configured to perform an operation, this should be interpreted to mean that it may be implemented using a programmable computer system programmed with a program of instructions to make the computer system perform the operation. Such a computer system may comprise one or more programmable processors. The program may be provided in a computer readable medium, such as a semiconductor memory, or a magnetically or optically readable disk or tape etc. When a module or other element is said to perform an operation or to be configured to perform an operation this should be interpreted to mean that the module or element may also comprise a circuit that is specifically designed to perform part or all of the operation.

Although the requests for recommendations that are used to select target users to prompt for a rating value may be explicit requests for recommendations, it should be appreciated that a requests from a user for a recommendation of an item may alternatively be derived indirectly, for example in response to retrieval of any information related to the item by the user.

In an embodiment a count of first users is determined that occur in a stored relation with a second user and for which at least one of the first users no rating of the item has been recorded. In this embodiment the automatic transmission of queries is delayed if said count is below a predetermined threshold that is greater than one. In this way, it is made possible to reduce message traffic by collecting more first users before the queries are sent. In a further embodiment the delay may be omitted once a time interval of more than a predetermined duration has occurred after the request from the second user.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method of operating a rating-based recommender system for content items accessible to a plurality of users, said recommender system comprising a communication network connecting a plurality of user stations and a storage system, wherein each of said plurality of user stations comprises at least one user interface and wherein said storage system stores representations of relations between users at least as pairs of user identifiers that indicate related persons, the method comprising:
   providing stored representations of relations between users in said storage system;
   detecting access to a content item by one or more first users using said user interface and recording said access in said storage system;
   subsequently to said recording, detecting access to the content item by a second user using said user interface;
   subsequently to detecting said access by said second user, detecting by said recommender system a request from said second user for a rating of said content item previously accessed by said one or more first users, said request being detected by said user interface;
   only upon detection of said request for a rating:
      a) selecting by said recommender system at least one of the one or more first users for which access to the content item has been recorded in the storage system, based on at least one of the pairs of user identifiers corresponding to occurrence of the at least one of the one or more first users and the second user in the stored representation of the pairs, wherein the selected one or more first users have not previously provided a rating for the content item; and
      b) automatically transmitting by said recommender system to said user interface over said communication network a query message to enter a rating for the content item to a user address associated with the one or more first users selected at the previous step a), wherein a reference to the second user is included in the query message;
   receiving, by the recommender system over said communication network, the rating requested from the selected one or more first users, wherein said rating is input by said user interface;
   storing, by the recommender system, the rating from the selected one or more first users, wherein the rating is stored with other ratings of the content item in said storage system;
   providing the rating received from the selected one or more first users to the second user through said user interface;
   computing score values for pairs of users, each pair comprising the second user and a respective one of the first users, each score value being computed from a correlation between ratings given for further items given by the respective one of the first users and a rating or access to the further items by the second user; and
   selecting of at least one of the first users comprising selecting the at least one of the first users dependent on whether the score value for a pair of the second user and the at least one of the first users exceeds a threshold value.

2. The method according to claim 1, further comprising recording ratings given for the item by the one or more first users in a collection of ratings in the storage system, wherein selecting at least one of the first users having a user identifier corresponding to the user identifier of the second user in at least one of the stored pairs comprises selecting at least one of the first users that has not given a rating for the item.

3. The method according to claim 1, further comprising:
   receiving a reply to the query message, or information derived from the reply, in the recommender system; and
   transmitting a rating or recommendation based on the reply to a user address associated with the second user.

4. The method according to claim 3, comprising obtaining an address of the second user based on the query message, the rating or recommendation being transmitted to the user address associated with the second user based on the obtained address.

5. The method according to claim 1, wherein said request for a rating of the item for the second user comprises a request to present a list of recommendations to the second user, the item being selected as a candidate for recommendation to the second user.

6. The method according to claim 1, wherein said request for a rating of the item for the second user is generated in response to the second user requesting information about the item.

7. A computer program comprising a program of instruction for a programmable computer system that, when executed by the programmable computer system, causes the programmable computer system to execute the method of claim 1.

8. A rating-based recommender system, comprising:
   a communication network connection a plurality of user stations and a storage system, wherein each of said plurality of user stations comprises at least one user interface;
   a storage system for storing information representing relations between users and access events to a content item by one or more first users;
   a processor configured to:
      detect the access events using said user interface and to store records in the storage system, wherein the records indicate the one or more first users that accessed the content item;
      subsequently to said recording, detect at said recommender system an access event by a second user to a content item;
      subsequently to detecting said access event by said second user, detect at said recommender system a request from a second user for a rating of said content item previously accessed by said one or more first users, the request being linked to a second user, said request being detected by said user interface;
   only upon detection of said request for a rating:
      a) select by said recommender system at least one of the one or more first users for which access to the content item has been recorded in the storage system, based on occurrence of the at least one of the one or more first users having stored in the storage system a relation with the second user, dependent on said stored records, wherein the selected one or more first users have not previously provided a rating for the content item; and
      b) automatically transmit from said recommender system a query message to said user interface over said communication network to enter a rating for the content item to a user address associated with the one or more first users selected at the previous step a), the query message including a reference to the second user in the query message;
   receive, by the recommender system, the rating requested from the selected one or more first users;

store, by the recommender system over said communication network, the rating from the selected one or more first users, wherein said rating in input by said user interface, wherein the rating is stored with other ratings of the content item; and provide the rating received from the selected one or more first users to the second user through said user interface;

wherein the processor is further configured to:

compute score values for pairs of users, each pair comprising the second user and a respective one of the first users, each score value being computed from a correlation between ratings given for further items given by the respective one of the first users and a rating or access to the further items by the second user; and select the at least one of the first users dependent on whether the score value for a pair of the second user and the at least one of the first users exceeds a threshold value.

9. The recommender system according to claim 8, wherein the processor is further configured to receive ratings for the item from the one or more first users and to record the ratings in the storage system in combination with an indication of the first user that inputted the rating, and wherein the storage system is configured to store the rating given for the item by the one or more first users and wherein in selecting at least one of the one or more first users for which access to the item has been recorded in the storage system, the processor is further configured to select at least one of the one or more first users that has not given a rating for the item.

10. The recommender system according to claim 8, wherein the processor is further configured to respond to reception of a response to the query message by transmitting a rating or recommendation to the user address associated with a second user.

11. The recommender system according to claim 8, further comprising a user station configured to obtain the user address of the second user on the basis of the query and to respond to the query by transmitting the information derived from the reply directly or indirectly to both the storage system and said user address.

12. The recommender system according to claim 8, wherein the processor is further configured to detect a request to present a list of recommendations to the second user, the item being selected as a candidate for recommendation to the second user.

13. The recommender system according to claim 8, wherein the processor is further configured to detect a request for a rating of the item generated in response to the second user requesting information about the item.

14. The recommender system according to claim 1, wherein the content items comprise video content, the recommender system comprising an electronic program guide.

15. The recommender system according to claim 8, wherein the content items comprise video content, the recommender system comprising an electronic program guide.

* * * * *